US010324180B1

(12) United States Patent
Lawton et al.

(10) Patent No.: US 10,324,180 B1
(45) Date of Patent: Jun. 18, 2019

(54) SEVERE WEATHER DETECTION, CLASSIFICATION AND LOCALIZATION USING DUAL-POLARIZATION RADAR

(71) Applicant: Baron Services, Inc., Huntsville, AL (US)

(72) Inventors: Michael Lawton, Huntsville, AL (US); Nathan Purves, Huntsville, AL (US); David Purves, Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 843 days.

(21) Appl. No.: 14/030,459

(22) Filed: Sep. 18, 2013

(51) Int. Cl.
*G01S 13/95* (2006.01)

(52) U.S. Cl.
CPC .......... *G01S 13/958* (2013.01); *G01S 13/95* (2013.01)

(58) Field of Classification Search
CPC ........................................ G01S 13/95–13/958
See application file for complete search history.

(56) References Cited

U.S. PATENT DOCUMENTS

| | | | | |
|---|---|---|---|---|
| 3,302,200 | A * | 1/1967 | Atlas | G01S 13/951 342/180 |
| 5,523,759 | A * | 6/1996 | Gillberg | G01S 13/953 342/26 B |
| 5,717,589 | A | 2/1998 | Thompson et al. | |
| 6,125,328 | A | 9/2000 | Baron et al. | |
| 6,163,756 | A | 12/2000 | Baron et al. | |
| 6,188,960 | B1 | 2/2001 | Baron et al. | |
| 6,272,433 | B2 | 8/2001 | Baron et al. | |
| 6,278,947 | B1 | 8/2001 | Baron et al. | |
| 6,356,843 | B1 | 3/2002 | Baron et al. | |
| 6,401,039 | B1 | 6/2002 | Baron et al. | |
| 6,670,908 | B2 | 12/2003 | Wilson et al. | |
| 6,751,580 | B1 | 6/2004 | Cope et al. | |
| 7,427,943 | B1 * | 9/2008 | Kronfeld | G01S 7/20 342/175 |
| 7,558,674 | B1 | 7/2009 | Neilley et al. | |

(Continued)

OTHER PUBLICATIONS

Trafalis T.B., Santosa, B., & Richman, T.B.; Feature selection with linear programming support vector machines and applications to tornado prediction; WSEAS Transactions on Computers; Aug. 2005; pp. 865-873; vol. 4, No. 8; United States.

(Continued)

*Primary Examiner* — Matthew M Barker
(74) *Attorney, Agent, or Firm* — Frank M. Caprio; Stephen H. Hall; Bradley Arant Boult Cummings LLP (57) ABSTRACT

The present disclosure provides a system that predicts the occurrence and location of a severe weather event including a non-transitory tangible media containing software or firmware encoded thereon for operation by one or more processors that receive a plurality of weather variables, at least one of said weather variables being from radar data from a dual-polarization radar, where the processor (i) generates at least one derived radar variable based on the weather variables, (ii) identifies a geographical region of interest, (iii) validates the presence of the region of interest, (iv) determines whether there is a vertical column of regions of interest, wherein the presence of the vertical column of regions of interest is indicative of the vertical size of the severe weather event and (viii) validates the presence of the vertical columns of regions of interest.

18 Claims, 6 Drawing Sheets

(56) References Cited

U.S. PATENT DOCUMENTS

| | | | |
|---|---|---|---|
| 7,561,970 B1 | 7/2009 | Neilley et al. | |
| 7,917,291 B2 | 3/2011 | Havin et al. | |
| 8,212,712 B2 * | 7/2012 | Bon | G01S 7/062 |
| | | | 342/26 B |
| 8,452,537 B2 * | 5/2013 | Havin | G01W 1/10 |
| | | | 702/1 |
| 8,902,100 B1 * | 12/2014 | Woodell | G01S 13/95 |
| | | | 324/74 |
| 2001/0049584 A1 | 12/2001 | Jones et al. | |
| 2001/0052847 A1 | 12/2001 | Auerbach | |
| 2003/0025627 A1 | 2/2003 | Wilson et al. | |
| 2005/0049789 A1 | 3/2005 | Kelly et al. | |

OTHER PUBLICATIONS

Ryzhkov, A.V., Schuur, T.J., & Burgess, D.W.; Polarimetric tornado detection; Journal of Applied Meteorology; May 2005; pp. 557-570; vol. 44; United States.

Kumjian, M.R., & Ryzhkov A.V.; Polarimetric signatures in supercell thunderstorms; Jul. 2008; pp. 1940-1961; vol. 47; United States.

Bodine, D.J., Kumjian, M.R., Palmer, R.D., Heinselman, P.L., & Ryzhkov, A.V.; Tornado damage estimation using polarimetric radar; Feb. 2013; pp. 139-158; vol. 28; United States.

\* cited by examiner

Figure 4. Vertical columns of ROIs extracted from the 1558 UTC VCP from the March 2$^{nd}$, 2012 tornado event that occurred in North Alabama.

Figure 5. Values of Correlation Coefficient (top row) and Shear Rate (bottom row) for radar bins in a neighborhood of two potential TDS ROIs, one of which is a valid TDS ROI (left column) and one of which is an invalid ROI (right column).

Figure 6. Images of dual-polarization radar variables collected about an potential TDS ROI.

SEVERE WEATHER DETECTION, CLASSIFICATION AND LOCALIZATION USING DUAL-POLARIZATION RADAR

FIELD OF THE DISCLOSURE

The present disclosure relates to the field of severe weather detection and in particular to the identification, localization and classification of severe weather.

BACKGROUND

Severe weather such as tornadoes and hail pose substantial public safety hazards and are the source of substantial financial losses each year. While there are a wide variety of automated methods for detecting tornadoes and hail using traditional single-polarization ("single-pol") weather radars, the use of dual-polarization ("dual-pol") radar data can substantially improve upon existing methods. In particular, debris lofted by tornadoes and hail cores often have distinct signatures in dual-pol radar data. Though the signatures of these severe weather events are distinct, there is a lack of automated detection systems for identifying them.

Particularly lacking in the current art is the ability to determine if a tornado visible on radar has actually touched down on the ground. While traditional single-pol radars can provide strong evidence for the presence of tornadoes, it can be very difficult to determine if a given storm has spawned a tornado that is actually causing damage on the ground. Moreover, when a tornado is rain-wrapped or during a nighttime storm, spotters on the ground may not be able to provide visual confirmation of a tornado on the ground. In some cases, "debris balls", regions containing debris lofted by tornadoes, can be seen in single pol reflectivity. However, it can be difficult to distinguish what might be a debris ball in rain-wrapped tornadoes or in tornadoes embedding in a line of storms. Dual-pol radars, on the other hand, provide a much more finely detailed view of the shapes and amounts of lofted material, resulting in a much clearer picture of a tornado debris signature ("TDS"). The presence of a TDS in dual-polarization radar data is strong indication that there is a tornado on the ground. The present disclosure provides an improved method of detecting, classifying and determining the location of a TDS.

BRIEF DESCRIPTION OF THE FIGURES

A more particular description of the invention will be rendered by reference to specific embodiments thereof which are illustrated in the appended FIGS. 1-3. It is appreciated that these figures are not to be considered limiting in scope. The invention will be described and explained with additional specificity and detail through the use of the accompanying figures in which.

SUMMARY OF THE DISCLOSURE

In a first aspect, the present disclosure provides a system that predicts the occurrence and location of a severe weather event including a non-transitory tangible media containing software or firmware encoded thereon for operation by one or more processors that receive a plurality of weather variables, at least one of said weather variables being from radar data from a dual-polarization radar, where the processor (i) generates at least one derived radar variable based on the weather variables, (ii) identifies a geographical region of interest, (iii) validates the presence of the region of interest, (iv) determines whether there is a vertical column of regions of interest, wherein the presence of the vertical column of regions of interest is indicative of the vertical size of the severe weather event and (viii) validates the presence of the vertical columns of regions of interest.

In a second aspect, the present disclosure provides a computer implemented method of determining the existence of a severe weather event comprising the steps of: collecting radar data from a dual-polarization radar, said radar data comprising a weather variable; processing the radar data to determine at least one derived radar variable; identifying a geographic region of interest; validating the presence of a region of interest; identifying vertical columns of regions of interest; and validating the presence of the vertical columns of regions of interest.

DETAILED DESCRIPTION

Definitions

With reference to the use of the word(s) "comprise" or "comprises" or "comprising" in the following description and claims, unless the context requires otherwise, those words are used on the basis and clear understanding that they are to be interpreted inclusively, rather than exclusively, and that each of those words is to be so interpreted.

Furthermore, reference in the specification to "an embodiment," "one embodiment," "various embodiments," or any variant thereof means that a particular feature or aspect of the invention described in conjunction with the particular embodiment is included in at least one embodiment of the present invention.

The term "about" as used herein refers to a value that may vary within the range of expected error inherent in typical measurement techniques known in the art.

The terms "storage device" or "storage medium" as used herein refers to a machine-readable device/medium that retains data that can be read by mechanical, optical, or electronic means, for example by a computer. Such devices are sometimes referred to as "memory," although as used herein a machine-readable data storage device cannot comprise a human mind in whole or in part, including human memory. A storage device/medium may be classified as primary, secondary, tertiary, or off-line storage. Examples of a storage device/medium that is primary storage include the register of a central processing unit, the cache of a central processing unit, and random-access memory ("RAM") that is accessible to a central processing unit via a memory bus, a static random access memory ("SRAM"), a dynamic random access memory ("DRAM"), an electronically erasable programmable read-only memory ("EEPROM") and a programmable read-only memory ("PROM"). Primary storage is generally volatile memory, which has the advantage of being rapidly accessible. A storage device that is secondary storage is not directly accessible to the central processing unit, but is accessible to the central processing unit via an input/output channel. Examples of a storage device/medium that is secondary storage include a mass storage device, such as a magnetic hard disk, an optical disk, a drum drive, flash memory, a floppy disk, a magnetic tape, an optical tape, a paper tape, and a plurality of punch cards. A storage device/medium that is tertiary storage is not connected to the central processing unit until it is needed, generally accessed robotically. Examples of a storage device/medium that is tertiary storage may be any storage device that is suitable for secondary storage, but configured such that it is not constantly connected to the central processing unit. A storage device/medium that is off-line storage is not connected to the central processing unit, and does not become so connected without human intervention. Examples of a storage device/medium that is off-line storage may be any storage device that is suitable for secondary storage, but configured such that it is not constantly connected to the central processing unit, and does not become so connected without human intervention (such as "cloud computing"). Secondary, tertiary, and offline storage devices/mediums are generally non-volatile, which has the advantage of requiring no source of electrical current to maintain the recorded information. A storage device/medium excludes signals, carrier waves and other similar transitory propagating signals.

The term "processor" or "central processing unit" ("CPU") as used herein refers to a software execution device capable of executing a sequence of instructions ("program"). The CPU comprises an arithmetic logic unit, and may further comprise one or both of a register and cache memory.

The term "machine-readable format" or "machine-readable storage" as used herein refers to a tangible medium of storing information that is configured to be read by a machine or processor. Such formats include magnetic media, optical media, and paper media (punch cards, paper tape, etc.). Printed writing in a human language, if not intended or configured to be read by a machine, is not considered a machine readable format or machine-readable storage. In no case shall a human mind be construed as machine readable format or machine-readable storage. Further, neither machine readable format nor machine-readable storage shall be construed to include any form of transitory tangible media.

The term "database" as used herein refers to an organized data structure comprising a plurality of records stored in machine-readable format or machine-readable storage.

Methods of Detection, Classifying and Determining the Location of Severe Weather In one aspect, the present disclosure provides a method and system for detecting and determining the location of severe weather, such as tornadoes, regions of high wind shear, tornado vortices and hail. In one embodiment, the present disclosure provides for a method and system for detecting and determining the location of debris lofted in the atmosphere by a tornado (i.e., a TDS) or a hail core.

Figure 1:
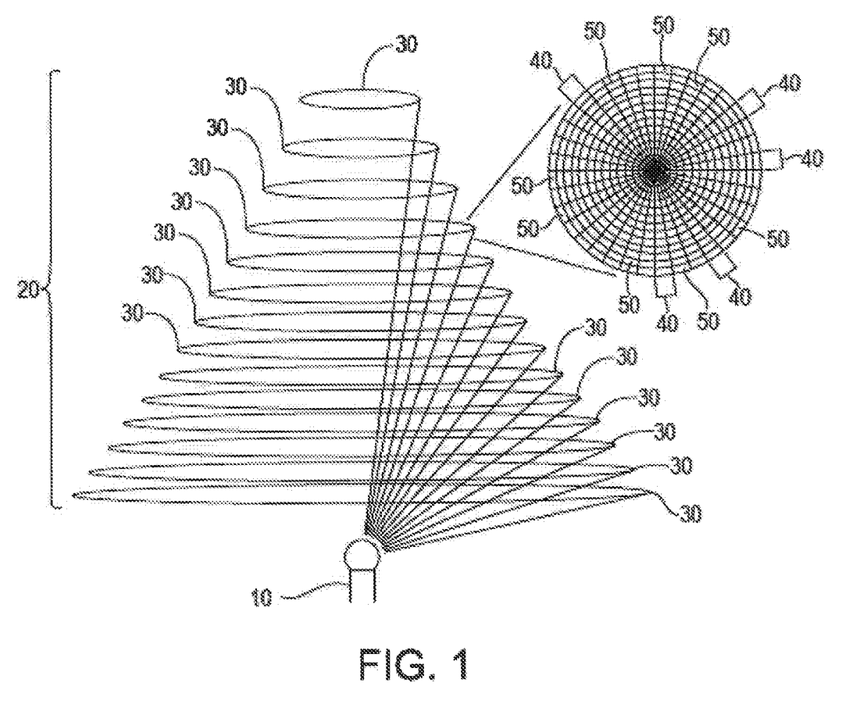
FIG. 1 shows one embodiment of a radar volume coverage pattern 20.

Referring now to FIG. 1, the present disclosure utilizes, at least in part, some of the weather data (or variables) now available to forecasters through dual-pol radar 10 technology. Dual-pol radar 10 sends two (2) simultaneous pulses of radar beams at a target (such as a super cell thunderstorm). Often these pulses exhibit an orthogonal orientation in that a first radar beam is in a vertical plane (or has a vertical polarization) and a second radar beam is in a horizontal plane (or has a horizontal polarization). Of course, the first radar beam may be in the horizontal plane and the second radar beam may be in the vertical plane. Thus, independent sets of data will be returned by the first and second radar beams respectively.

FIG. 1 shows one embodiment of a radar volume coverage pattern 20 ("VCP") possible using dual-pol radar 10. Generally, the VCP is organized into a series of tilts 30 representing different vertical planes, each tilt 30 can then be subdivided into a plurality of radials 40 with each radial 40 representing a distinct area of a tilt 30. Each radial 40 can further be subdivided into a plurality of radar bins 50.

Dual-pol radar 10 allows forecasters to observe and measure a number of weather variables present, or that can be calculated present variables, from each radar bin 50. By way of illustration, a radar bin 50 might comprise the following weather variables: reflectivity (Z), Doppler velocity (V), spectrum width (W), differential reflectivity ($Z_{DR}$), differential phase ($\Phi_{DP}$) and cross-correlation coefficient ($\rho_{hv}$). The foregoing list is illustrative only and other weather variables may be present or calculated from a radar bin 50.

Reflectivity (Z) is a measurement of the intensity of return signals (or echoes) from targets. Generally, stronger or more intense storms show a greater reflectivity than weaker or less intense storms. Doppler velocity (V) is a measurement of the speed and direction of a target based upon Doppler Effect. Spectrum width (W) is a measurement of the distribution of velocities within a single radar pixel. Differential reflectivity ($Z_{DR}$) is a measurement of the difference in returned energy between the horizontal and vertical pulses of the radar. Differential phase ($\Phi_{DP}$) is a measurement of the difference in phase between the horizontal and vertical pulses of the radar as they propagate through a medium such as rain or hail and are subsequently attenuated (slow down). Cross-correlation coefficient ($\rho_{hv}$) is a measurement of the degree of similarity among scatterers in a sample volume.

Among the several weather variables measured by a dual-polarization radar, the cross-correlation coefficient ($\rho_{hv}$) is very useful for detecting a TDS as a TDS stands out strongly in this variable as debris scatters the radar pulse in a very disorganized and random fashion, resulting in very low values of cross-correlation coefficient ($\rho_{hv}$). Therefore, if a location shows relatively high reflectivity (Z), low cross-correlation coefficient ($\rho_{hv}$), and high shear in Doppler velocity (V), then it is likely that that there is debris aloft at that location.

Figure 2:
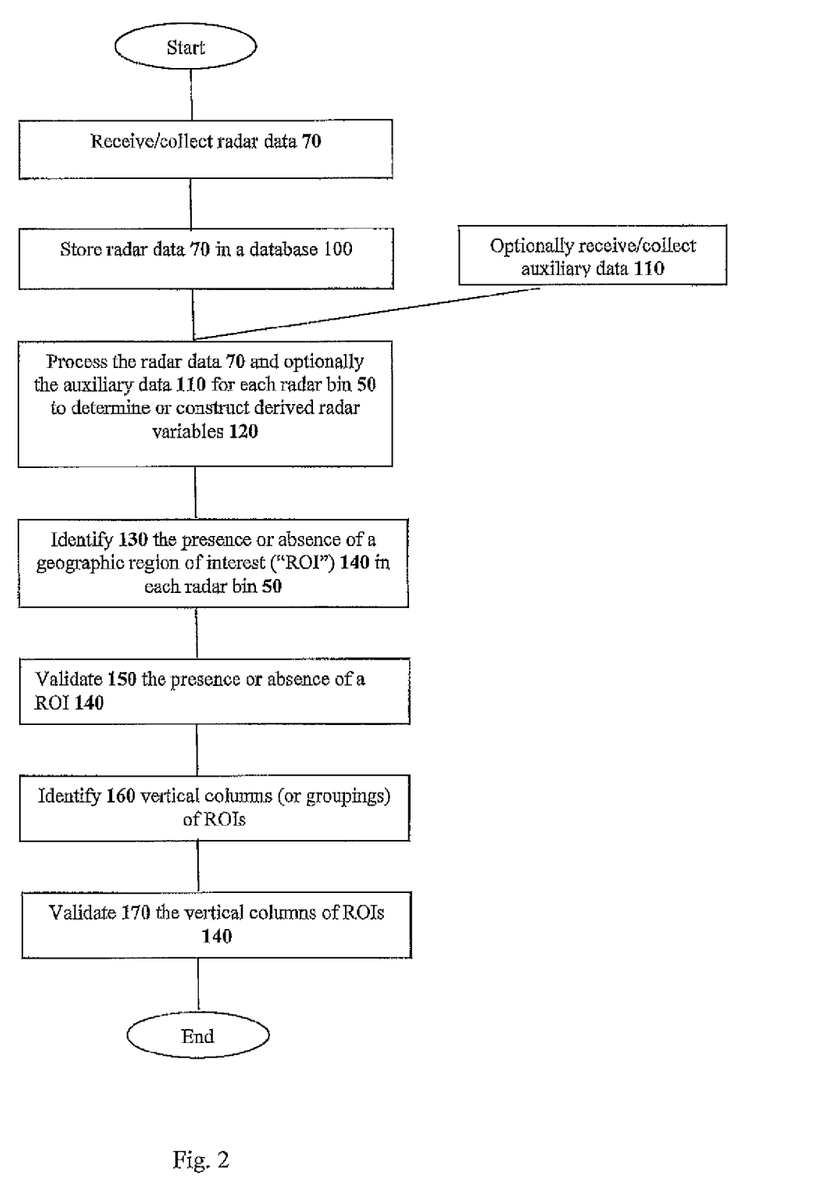
FIG. 2 shows one embodiment of the severe weather detection process disclosed herein.

FIG. 2 illustrates one embodiment of the severe weather detection process disclosed herein. Generally, in one embodiment, the method comprises (i) the collection or reception of radar data 70 comprising weather variables from a data feed (typically sent over a communications link) by a severe weather detection apparatus, (ii) storing the radar data 70 in a database 100, (iii) optionally receiving or collecting auxiliary data 110 such as a numerical weather model output, satellite imagery, atmospheric soundings, climatology data, topography data or other atmospheric data, (iv) processing the radar data 70 and optionally the auxiliary data 110 for each radar bin 50 to determine or construct derived radar variables 120, (v) identifying 130 the presence or absence of a geographic region of interest ("ROI") 140 in each radar bin 50 or in a plurality of radar bins 50, (vi) validating 150 the presence or absence of a ROI by assigning a numerical score to each ROI, (vii) identifying 160 vertical columns (or groupings) of ROIs and (viii) validating 170 the vertical columns of ROIs 140. Each of these steps is discussed in more detail herein.

The radar data 70 may be received or collected from a data feed from any dual-pol radar data 70 source such as local dual-pol radars 10 or the National Weather Service. Generally, the radar data 70 will include at least one of the following weather variables: (i) reflectivity (Z), Doppler velocity (V), spectrum width (W), differential reflectivity ($Z_{DR}$), differential phase ($\Phi_{DP}$) and cross-correlation coefficient ($\rho_{hv}$).

After the severe weather detection apparatus receives or collects the radar data 70, the radar data 70 is stored in a database 100 located in a storage medium for further use and processing as described herein.

In one embodiment, the method disclosed herein also uses auxiliary data 110 to detect the presence, classification and location of severe weather. In this embodiment, the severe weather detection apparatus receives or collects auxiliary data 110 such as a numerical weather model output, satellite imagery, atmospheric soundings, climatology data, topography data or other atmospheric data from a data feed (which may be the same data feed as the data feed from a radar source or may be a different data feed). The auxiliary data 110 may include atmospheric data such as Convective Available Potential Energy ("CAPE") and model-derived Atmospheric Freezing Level. Auxiliary data 110 may be provided by the NWS, other government agencies, or from private third parties.

After the radar data 70 and, optionally the auxiliary data 110, are received or collected by the severe weather detection apparatus and stored in the database 100, the severe weather detection apparatus uses the radar data 70 and optionally the auxiliary data 110 to derive or calculate derived radar variables 120. This step comprises the derivation of additional numerical values (or identifiers) associated with each radar bin 50.

In one embodiment where the severe weather detection apparatus aims to identify a TDS 180 in a ROI 140, there are a number of possible derived radar variables 120 that can be used, but among the most important derived variables are specific differential phase ($K_{DP}$) and shear rate (S). Other derived radar variables 120 applicable to the identification of a TDS 180 or other severe weather phenomenon in a ROI 140 are those derived through the collection of spatial statistics from one or more radar variables. These spatial statistics, calculated from one or more radar variables in a small region about a radar bin 50, could include measures of texture such as variance, measures of curvature or gradient, correlation matrices (or indexes derived from correlation matrices), or measures of spatial autocorrelation such as Moran's I.

$K_{DP}$ is particularly important for the detection of hail and for distinguishing hail from lofted debris as it yields important information about the amount of liquid water in a radar bin 50. $K_{DP}$ is an estimate of the range derivative of differential phase, $\Phi_{DP}$:

$$K_{DP} \equiv \frac{\overline{\partial \Phi_{DP}}}{dr},$$

where $$\frac{\overline{\partial \Phi_{DP}}}{dr}$$

is a weighted least squares estimator of $$\frac{d\Phi_{DP}}{dr}$$

and r indicates distance from the radar. $K_{DP}$ is a standard derived radar variable and its construction is well known to those of skill in the art.

Shear rate is an estimate of wind shear derived from Doppler velocity and is very useful for the detection of circulations associated with tornadoes and their formation as well as for the detection of a TDS 180. If a tilt 30 of Doppler velocity data is represented as points of the form p=(x,y,z,v), where x, y, and z are spatial dimensions and v is Doppler velocity, then a shear rate can be constructed at a focal point in three steps. First, a tangent plane is fit to the collection of points near the ROI 140; next, the gradient of that tangent plane is determined; and finally the magnitude of the horizontal component of the resulting gradient vector is extracted. The resulting value is the maximal spatial rate of change of the Doppler velocity surface and its magnitude indicates the degree of shear at the focal point. For example, if Doppler velocity is strongly positive on one side of a focal location (indicating wind rapidly approaching the radar) and strongly negative on the other side (indicating wind rapidly moving away from the radar), then there is likely strong circulation at that location, perhaps indicating tornadic activity. In this case, the tangent plane at the focal location would be steeply sloped, resulting in a large value of shear rate. As S is a spatial derivative of Doppler velocity, its units are m·s$^{-1}$·km$^{-1}$=s$^{-1}$.

After calculating derived radar variables 120, the severe weather detection apparatus then identifies 130 the presence or absence of a ROI 140 in each radar bin 50. The severe weather detection apparatus may utilize several different methodologies for the identification of ROIs 140 including the construction of derived radar variables 120 which serve as indicator variables for potential inclusion in ROIs 140 and identification of ROIs 140 by assigning numerical scores to regions of radar tilts 30 by extracting a set of images for each derived radar variable 120 in the ROI 140 and then assigning a numerical score through the application of tests trained to identify the potential presence of severe weather in the image set.

In one embodiment of the current invention related to the detection of TDS 180, ROIs 140 are identified in each tilt 30 of radar data 70 using the base dual-pol weather variables (Z, V, rho, $Z_{dr}$) as well as $K_{DP}$ and S. These ROIs 140 are identified by first calculating a derived radar variable 120 that is the probability that a given radar bin 50 is an element of a TDS 180 as a function of the median values of radar variables in a neighborhood of the radar bin 50. An example of such a function is $$P(TDS \mid Z, \rho_{hv}, Z_{DR}, S) = \frac{1}{1 + e^{-f(Z, \rho_{hv}, Z_{DR}, S)}}$$

where f(Z,$\rho_{hv}$,$Z_{DR}$,S) is a linear combination of Z, $\rho_{hv}$, $Z_{DR}$, and S and their pair wise interaction terms. The coefficients of the linear combination in f can be estimated using maximum likelihood estimation on labeled training data via logistic regression. While this example uses the four variables, variations can incorporate any set of radar variables. Once this indicator variable has been calculated for each radar bin 50 in a tilt 30, it can be used to identify ROIs 140.

The indicator variable described in the previous paragraph can be used to identify ROIs 140 in a three step procedure. First, a threshold is applied to the indicator variable, culling all radar bins 50 in the tilt 30 that have indicator variable values above (or below) that threshold. Next, the remaining radar bins 50 are grouped into clusters (collections of adjacent or proximate radar bins 50) using a standard clustering method such as Euclidean Cluster Extraction. Finally, resulting clusters that are either too large or too small are discarded.

After identifying ROIs 140 that may be associated with severe weather in a tilt 30, those ROIs 140 are examined by a ROI validation procedure 150 which assigns a numerical score to each ROI 140. These scores can indicate classification into type of severe weather, intensity of the weather, a probability, or a binary truth value indicating that an ROI 140 has passed or failed the test or tests applied by the validation procedure 150. These tests are the result of applying a mathematical function or process to a variety of features of an ROI 140 which can include derived radar variables 120 value within the region, morphological features of the region (for example, the region's size, eccentricity, departure from convexity, or aspects of the regions axial skeleton), or any similar features of a morphological transform of the ROI 140.

In one embodiment, the validation procedure 150 comprises the comparison of values of derived radar variables 120 within the ROI 140 with values of derived radar variables 120 in a dilation of the ROI 140 (the derived radar variables 120 for a small ROI 140 can be compared to the derived radar variables 120 for a larger ROI 140 that comprises the smaller ROI 140). For example, correlation coefficient, $\rho_{hv}$, in an ROI 140 consistent with a TDS 180 will often be lower than in surrounding values. Therefore, the difference in pi, between the interior of the ROI 140 and a dilation of the ROI 140 can be used to distinguish between a legitimate TDS 180 ROI 140 and a ROI 140 that resulted from another phenomenon such as degraded data quality due to non-uniform beam filling.

Figure 3:
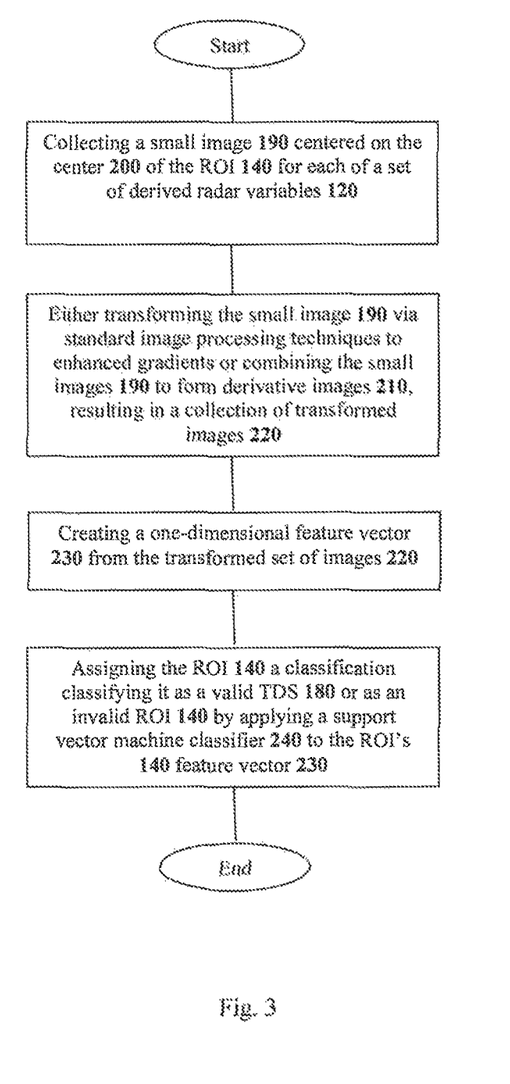
FIG. 3 shows one embodiment of validating presence of a ROI 140 as disclosed herein.

In another embodiment shown in FIG. 3, the validation procedure 150 comprises collecting a small image 190 centered on the center 200 of the ROI 140 for each of a set of derived radar variables 120. This collection of images 190 may then be transformed via standard image processing techniques to enhanced gradients or combined to form derivative images 210, resulting in a collection of transformed images 220. A one-dimensional feature vector 230 is then created from this transformed set of images 220. This feature vector 230 can be created either by using the full image set 220, flattening each image into a single array and then concatenating each of these arrays, or by extracting derived features from these images. In the latter approach, image features can consist of image gradients, image histograms, or the result of template matching or wavelet transforms. The final feature vector 230 incorporates information from each image and may be transformed via a principle components analysis prior to the next step. The ROI 140 is then assigned a classification classifying it as a valid TDS 180 ROI 140 or as an invalid ROI 140 by applying a support vector machine ("SVM") classifier 240 (described below) to the ROI's 140 feature vector 230. In other embodiments, this procedure can be used to validate the presence of any weather event in a ROI 140 including without limitation a hail core, a region of high shear or a tornado vertex. This SVM 240 is trained offline using a large set of manually labeled images and saved for use in ROI 140 scoring.

A key step in the ROI 140 validation procedure 150 in the embodiment described in the preceding paragraph is the application of a SVM classifier 240. SVMs are well known mathematical models that are trained with data labeled as belonging to one or more categories and that, once trained, can predict into which category a new datum falls. As such, SVMs are classified as supervised learning classifiers. Mathematically, a SVM uses labeled training data to construct a hyperplane (or set of hyperplanes) which best separate the data into the labeled categories. When presented with new examples, the SVM assigns classifications to the new data based on where they sit with respect to the separating hyperplane (or hyperplanes). SVMs are widely used in machine learning applications and are well known to those proficient in the many disciplines that use machine learning techniques (e.g., computer vision, text analysis, bioinformatics, etc).

After the validation procedure 150, the severe weather detection apparatus attempts to identify 160 vertical columns (or groupings) of ROIs 140. In one embodiment, this step is accomplished by visiting a first ROI 140 and associating it with second, third, fourth, fifth, etc. ROIs 140 in tilts 30 above and below the first ROI 140. The resulting vertical columns can have branches in that an ROI 140 in one tilt may be connected to more than one ROI 140 in an adjacent tilt, but no ROIs 140 within a single tilt are connected. These vertical columns represent the potential vertical extent of the severe weather being detected.

These vertical columns are then assigned scores via the application of one or more tests. In the particular embodiment of TDS 180 detection, this score is used to either accept the vertical column as being a TDS 180 or to reject it as invalid. A simple example of assigning a score to a vertical column in the context of TDS 180 detection is simply demanding that the vertical column have at least one ROI 140 deemed valid by the ROI validation procedure 150 in each of the lowest three tilts 30 of radar data 70.

After identifying 160 vertical columns of ROIs 140, the vertical columns are validated 170. In this procedure, each vertical column identified as described above is assigned a numerical score which can represent a classification, an intensity, a probability, or a binary truth value. This numerical value is assigned to a given vertical column by applying one or more tests to a set of features of that column. The features that are inspected can be the number of constituent ROIs 140, a function of the individual ROI validation 150 scores of the column's constituent ROIs 140, or geometric/topological features of the vertical column. The relevant geometric/topological features of the column that can be used in the assignment of a vertical column validation score can be any of: the degree of branching of the vertical column, the total height or breadth of the vertical column, the orientation of the vertical column relative to the ground, or similar topological characteristics of subsets of the full vertical column.

Finally, it should be noted that components of the current invention as described above may be executed in parallel. For example, detection of ROIs 140 in lower tilts 30 of the radar data 70 may proceed while derived radar variables 120 are still being constructed for upper tilts 30. This form of parallelism prevents unnecessary latency in execution of the detection process.

After validation 170 of the vertical columns of ROIs 140, the vertical columns are stored for use in tracking severe weather using subsequent volume scans of radar data and for use in the generation of data products. These data products may consist of files, database entries, or encoded responses to remote requests and contain geospatial information for display in web or mobile apps or other display software. Data products generated as described herein may be displayed as imagery layers overlaid on a map, markers indicating detected locations on a map, or other graphical element along with various forms of metadata. One family of data products generated by application of the current invention incorporates results from the most recent volume of radar data as well as previous volumes to create swaths indicating the path that a severe weather phenomenon has taken over the recent past as well as projections indicating the potential path that the phenomenon will take in the near future. As discussed below, the data products may be transmitted to an end user.

Some of the components of the above-described system may be implemented with computers. A computer may be any processor (or microprocessor) controlled device, such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker.

The computer may be a single processor or multiprocessor machine. Additionally, the computer includes a storage device or a storage medium. The computer executes an appropriate operating system such as Linux, Unix, Microsoft® Windows® 95, Microsoft® Windows® 98, Microsoft® Windows® NT, Apple® MacOS®, IBM® OS/2®, and Palm® OS, and embedded operating systems such as Windows® CE or and the like. The computer may advantageously be equipped with a network communication device such as a network interface card, a modem, or other network connection device suitable for connecting to one or more networks.

The computer, and the storage device/medium, may advantageously contain control logic, or program logic, or other substrate configuration representing data and instructions, which cause the computer to operate in a specific and predefined manner as, described herein. In particular, the computer programs, when executed, enable a processor to perform and/or cause the performance of features of the present invention. The control logic may advantageously be implemented as one or more modules. The modules may advantageously be configured to reside on the storage device/medium and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as, by way of example, read-only memory ("ROM").

In some embodiments, features of the present invention can be implemented primarily in hardware using, for example, hardware components such as application specific integrated circuits ("ASICs") or field-programmable gated arrays ("FPGAs"). Implementation of the hardware state machine so as to perform the functions described herein will be apparent to persons skilled in the relevant art(s). In yet another embodiment, features of the invention can be implemented using a combination of both hardware and software.

The computer used to implement the remote system, or the elements thereof, may be an embedded microprocessor. For example, a cell phone or smart phone could also comprise an embedded microprocessor configured with control logic as described above to execute the functions of the remote system. The output/display system could then be the cell phone or smart phone visual display. Control of the remote system may be achieved by making the existing system buttons multipurpose.

In one embodiment, the severe weather detection apparatus is in communication with distribution network. In turn, the distribution network is in communication with one or more remote systems. Accordingly, after the presence of severe weather is indicated, the severe weather detection apparatus may communicate the presence of the severe weather to the remote systems via the distribution network (i.e., the data product is transmitted via the distribution network to the remote system). The distribution network can be various types of networks, including but not limited to satellite radio networks (for example networks conducted by Sirius XM Satellite Radio), cellular, WI-FI, Super WI-FI, WI Max, 802.15, Bluetooth®, cable television, pager, landline, etc.

The remote system may include a wireless network receiver to receive and decode signals transmitted over a wireless network. Where the distribution network is not wireless, the remote system would have an appropriate land-line counterpart depending on network connection protocols.

The remote system may be a cellular phone, smart phone, hand-held computing device, lap top, or other similar device. The remote system may be a unitary device, or in the alternative, may be implemented in a non-unitary arrangement of separate components. In all disclosed embodiments, the remote systems can be configured to provide some type of visual or aural alert of conditions affecting them.

In an alternative embodiment, remote system with positioning capabilities can track and transmit their locations to a central database, preferably co-located or in communication with the severe weather detection apparatus. Similar systems and methods are known in the art, for example, U.S. Pat. No. 6,603,405, the disclosure of which is incorporated herein by reference. In this embodiment, the current location and forecasted location of the remote systems can be compared to the weather conditions for the current and forecasted location of the remote systems as determined by the severe weather detection apparatus, and appropriate notices sent to the remote systems via the distribution network.

WORKING EXAMPLES

This section will describe the performance of this system in some detail for a single VCP 20 of a severe weather event that occurred on Mar. 2, 2012 near Huntsville, Ala. and will then discuss the system's performance for the full sequence of VCPs 20 in that event as well as in two additional severe weather events, one from June, 2013 near Atlanta, Ga. and one from May, 2013 near Dallas, Tex.

On the morning of Mar. 2, 2012 a series of storms moved through North Alabama. Between 1500 UTC and 1600 UTC, two supercell thunderstorms produced tornadoes, one of which caused substantial damage. These storms were observed by the dual-pol NEXRAD radar KHTX for their duration. One of the two tornadoes produced by these storms displayed a clear TDS 180 when the dual-pol radar data 70 was examined.

Archival dual-pol radar data 70 recorded by the KHTX radar for this severe weather event was presented to an implementation of a specific embodiment of the current disclosure designed to detect TDSs 180. The system's performance in general is well illustrated by its performance during the radar VCP 20 beginning at 1558 UTC. The following describes the process by which the implemented system performed TDS 180 detection.

Construction of Derived Variables

The first step taken by the implemented system after decoding the archival radar data was the construction of derived radar variables 120. Specific differential phase ($K_{dp}$) and Shear Rate (S) were constructed as described previously in this document. Next, the variables Z, rho, Zdr, Kdp, and S were used to calculate another derived variable 120 representing the probability that a given radar bin 50 is an element of a TDS 180 (described above), which will be denoted L.

ROI Extraction

After the construction of derived variables 120, ROIs 140 were extracted from each tilt 30 of the VCP 20 by first discarding all radar bins with L<0.9. Next, the system considered the remaining radar bins 50 tilt 30 by tilt 30, grouping neighboring points into ROIs 140 via Euclidean Cluster Extraction. 33 ROIs 140 were extracted from the VCP 20 beginning at 1558 UTC.

ROI Validation

Figure 5:
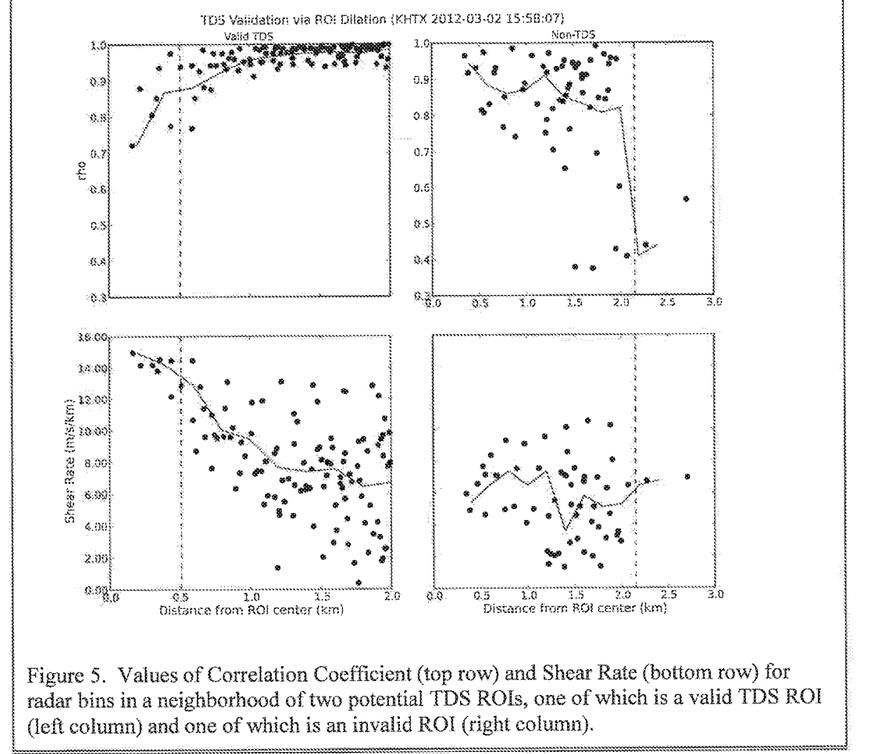
FIG. 5 shows one embodiment of grouping vertical columns of ROIs 140 using the process disclosed herein.

Each ROI 140 extracted in the procedure above was then subjected to the following validation procedure 150. Mean values of rho inside the ROI 140 were compared with mean values of the annular region added by dilating the ROI 140 by two kilometers and demanding the following three conditions: 1) the mean value of rho inside the ROI 140 differed from mean values in the annular region surrounding the ROI 140 by at least 0.06; 2) mean values inside the ROI were strictly less than 0.895; and 3) mean values of rho in the surrounding annular region were strictly greater than 0.91. ROIs 140 for which these conditions were met were deemed 'valid' TDSs 180 and ROIs 140 not meeting these conditions were deemed 'invalid'. The distributions of rho and S for a valid ROI 140 and an invalid ROI 140 are presented in FIG. 5. Of the 33 ROIs 140 extracted from the VCP 20 beginning at 1558 UTC, 15 were deemed to be valid.

Vertical Grouping of ROIs

Figure 4:
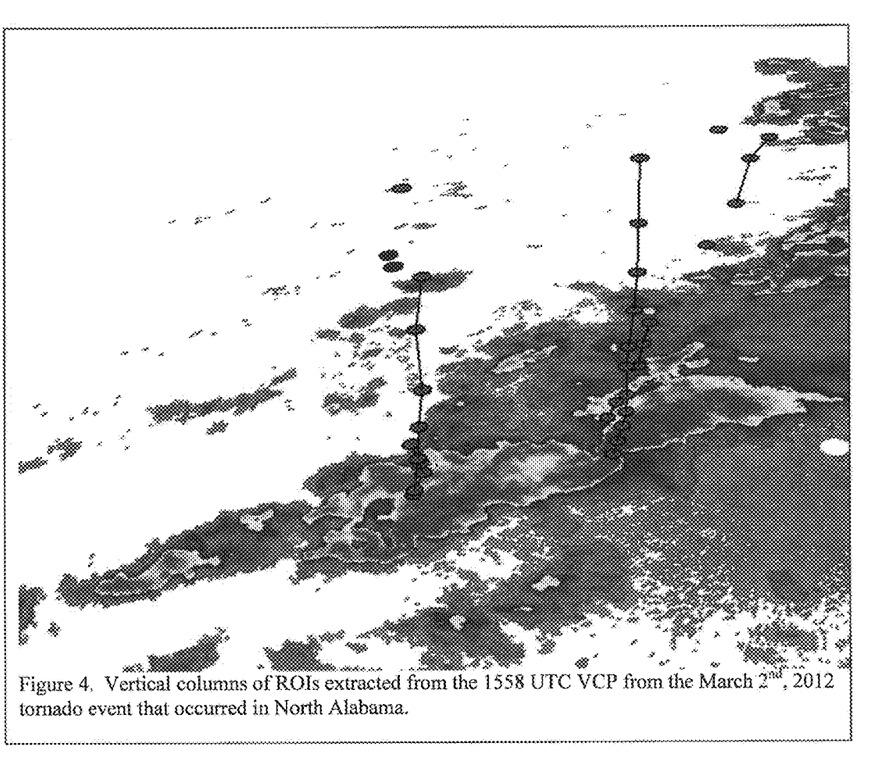
FIG. 4 shows one alternate embodiment validating the presence of ROIs as disclosed herein.

The next step in the processing of the VCP 20 beginning at 1558 UTC by the implemented system was the grouping of ROIs 140 into vertical columns. This was accomplished by considering each ROI 140 and associating ROIs 140 from tilts immediately above and below. A given ROI 140 was only associated with ROIs 140 with centroids (in terms of latitude and longitude) within 3 kilometers of the focal ROI's 140 centroid. This process was continued until all ROIs 140 had been considered. From the connections formed in this process, the disjoint sets of associated ROIs 140 constitute vertical columns of ROIs 140. Using this procedure, the 33 ROIs 140 extracted from the VCP 20 beginning at 1558 UTC were grouped into 8 vertical columns consisting of between two and 11 individual ROIs 140. These vertical columns can be seen in FIG. 4.

Validation of Vertical Columns

Each of the vertical columns constructed in the previous step were validated by requiring that the vertical column contains at least one valid TDS 180 ROI 140 (as determined by the ROI 140 validation procedure described above) in each of the lowest three tilts of the VCP 20. Of the 8 vertical columns in the VCP 20 beginning at 1558 UTC, only two even had constituent ROIs 140 in the lowest three tilts. Visual examination of the data in display software shows that the remaining two vertical columns were clearly associated with the two tornadoes visible by the radar. Both of these remaining vertical columns spanned over 8 tilts, indicating significant vertical structures in the radar data. However, only one of these vertical columns had valid ROIs 140 in the lowest three tilts 30. The vertical column that passed the validation procedure was associated with the primary tornado evident at 1558 UTC and contained 9 of the 15 ROIs 140 in the VCP 20 deemed to be individually consistent with TDSs 180. The identification of the primary tornado in the VCP 20 beginning at 1558 UTC constitutes successful performance of the implemented system.

Performance in Previous VCPs

The performance of the implemented system during the VCP 20 beginning at 1558 UTC was representative of the twelve previous VCPs 20 collected by the KHTX radar during the hour between 1500 UTC and 1600 UTC. From visual inspection, the first sign of a TDS 180 during this severe weather event occurred west of Athens, Ala. at approximately 1520 UTC. The implemented system detected TDSs 180 at 1520 and at 7 of the 9 VCPs between 1520 and 1558 UTC. The track described by the locations of the detected TDSs 180 follows the primary tornado's track as determined by post-event damage surveys nearly perfectly.

An Alternate ROI Validation Procedure

An important variation of the implemented system described above uses a different method for ROI 140 validation. In this variation, each ROI 140 is evaluated by examining a series of images centered on the ROI 140. These images are representations Z, V, rho, S, Kdp, and L in a region about the ROI (see FIG. 6). In order to construct a single feature vector describing these variables around the ROI 140, each 40×40 pixel image is collapsed into a single 1600-element vector. Next, each of the resulting six 1600-element vectors are concatenated into a single 9600-element vector. This large vector is then projected into a 70-dimensional vector space via the application of transformation based on a principal components analysis which was derived previously in an offline process. The resulting 70-element feature vector describes the nature of the dual-polarization variables about the ROI 140. Finally, the ROI 140 is classified as either a valid TDS 180 ROI 140 or as an invalid ROI 140 by the application of a support vector machine constructed previously using labeled training data.

Figure 6:
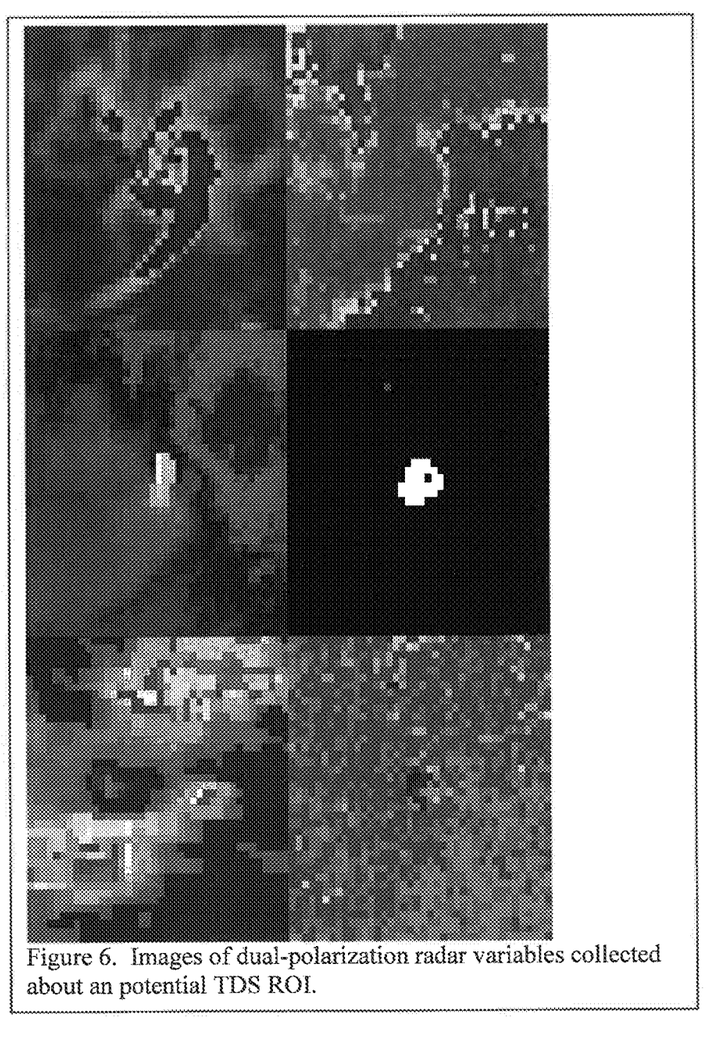
FIG. 6 shows one embodiment of the various dual-pol radar variables collected concerning a potential TDS.

The variation of the ROI 140 validation procedure was implemented in a system otherwise identical to the implemented system described in the previous sections. When this alternate system was applied to the VCP 20 beginning at 1558 UTC only one ROI 140 of 33 was classified as a valid TDS 180 ROI 140. The single valid ROI 140 was in the first tilt of the vertical column representing the primary tornado and so that vertical column was correctly classified as a valid TDS 180. Thus, the system implemented with this alternate, image-based, ROI validation procedure has been demonstrated to be an effective system for the detection of TDSs. Moreover, the 70-dimensional feature vectors constructed for ROIs 140 in this alternate form of the ROI 140 validation procedure are quite useful for the tracking of individual storm components over time.

Applications to Other Severe Weather Events

The system described above has been tested on a variety of severe weather events beyond the Mar. 2, 2012 case discussed in the previous sections and is currently configured to run in real-time on live dual-polarization radar data from each of the dual-polarization NEXRAD weather radars. This system has successfully identified TDSs 180 from a number of events including TDSs 180 in several tornadic supercells that formed during the large supercell outbreak on Apr. 14, 2012 in Oklahoma, a short-lived TDS 180 associated with the large wedge tornado that struck Hattiesburg, Miss. on Feb. 10, 2013, and several TDSs 180 associated with the storm system that passed South of Dallas, Tex. on May 16, 2013 among many others. Moreover, during each of these events, the implemented system distinguished between possible TDSs 180 which were actually invalid and legitimate TDSs 180.

Although particular embodiments of the present disclosure have been described, it is not intended that such references be construed as limitations upon the scope of this disclosure except as set forth in the claims.

We claim:

1. A system that predicts the occurrence and location of a severe weather event comprising:
    a. one or more processors;
    b. a non-transitory tangible media containing software or firmware encoded thereon for operation by the one or more processors that receive a plurality of weather variables, at least one of said weather variables being from radar data from a dual-polarization radar; where the one or more processors are configured (i) to generate at least one derived radar variable based on the weather variables, (ii) to identify at least one geographic region of interest by determining if the at least one derived radar variables is indicative of a potential severe weather event in the geographical area, (iii) to validate the presence of the geographic region of interest by validating the presence of at least one of a tornado debris signature, a hail core, a region of high shear or a tornado vertex therein, (iv) to determine whether there is a vertical column of regions of interest within the geographic of interest, wherein the presence of the vertical column of regions of interest is indicative of the vertical size of the severe weather event, (v) to validate the presence of the vertical columns of regions of interest by scoring each column by applying a test to a set of features of the vertical columns of interest, and (vi) to display a graphical representation of the location of the severe weather event.

2. The system of claim 1 wherein the weather variables comprise reflectivity (Z), Doppler velocity (V), spectrum width (W), differential reflectivity (ZDR), differential phase (ΦDP) and cross-correlation coefficient (ρhv).

3. The system of claim 1 wherein the weather variables include at least two of the following reflectivity (Z), Doppler velocity (V), spectrum width (W), differential reflectivity (ZDR), differential phase (ΦDP) or cross-correlation coefficient (ρhv).

4. The system of claim 1 wherein the derived weather variable is selected from the group consisting of specific differential phase ($K_{DP}$) and shear rate (S).

5. The system of claim 1 wherein the derived weather variable comprises specific differential phase (KDP) and shear rate (S).

6. The system of claim 1 further comprising the processor being configured to receive auxiliary data measurements.

7. The system of claim 6 wherein the auxiliary data measurements are selected from the group consisting of Convective Available Potential Energy ("CAPE") and model-derived Atmospheric Freezing Level.

8. The system of claim 7 wherein the processor uses at least one of the auxiliary data measurement to generate the derived radar variable.

9. The system of claim 1 wherein the severe weather event is a tornado.

10. The system of claim 1 wherein the processor identifies a region of interest by calculating the probability that the region of interest is part of a tornado debris signature, said calculation comprising comparing at least one derived radar variable for the region of interest to at least one derived radar variable of a plurality of additional regions of interest.

11. The system of claim 1 wherein the processor validates the presence of the region of interest by comparing the value of at least one derived radar variable for a first region of interest with the value of at least one derived radar variable for second region of interest, wherein the second region of interest is larger than and includes the first region of interest.

12. The system of claim 11 wherein the at least one derived radar variable is specific differential phase (KDP).

13. A computer implemented method of determining the existence of a severe weather event comprising the steps of:
    a. collecting radar data from a dual-polarization radar, said radar data comprising a weather variable;
    b. processing the radar data to determine at least one derived radar variable;

c. identifying a geographic region of interest by determining if the at least one derived radar variable is indicative of the existence of a severe weather event in the geographic region of interest;

d. validating the presence of at least one of a tornado debris signature, a hail core, a region of high shear or a tornado vertex within the geographic region of interest;

e. identifying vertical columns of regions of interest within the geographic region of interest;

f. validating the presence of the vertical columns of regions of interest by scoring each column by applying a test to a set of features of the vertical columns; and g. displaying a graphical representation of the location of the severe weather event.

14. The method of claim 13 wherein the weather variables comprise at least one of the following: reflectivity (Z), Doppler velocity (V), spectrum width (W), differential reflectivity (ZDR), differential phase ($\Phi DP$) and cross-correlation coefficient ($\rho hv$).

15. The method of claim 13 wherein the derived weather variable is selected from the group consisting of specific differential phase ($K_{DP}$) and shear rate (S).

16. The method of claim 13 wherein the derived weather variable comprises specific differential phase (KDP) and shear rate (S).

17. The method of claim 13 further comprising identifying a first region of interest by calculating the probability that the first region of interest is part of a tornado debris signature, said calculation comprising comparing at least one derived radar variable for the first region of interest to at least one derived radar variable of a plurality of additional regions of interest near or adjacent to the first region of interest.

18. The method of claim 13 further comprising validating the presence of the region of interest by comparing the value of at least one derived radar variable for a first region of interest with the value of at least one derived radar variable for second region of interest, wherein the second region of interest is larger than and includes the first region of interest.

* * * * *